March 1, 1932.  P. E. REIMULLER ET AL  1,847,850
INTERNAL COMBUSTION MOTOR
Filed April 23, 1928    6 Sheets-Sheet 3

*Fig. 3.*

Inventors
Paul E. Reimuller
Caryl Reimuller
Oscar C. Reimuller
Dagmar H. Reimuller
By George I. Haight
Atty

Witness:
William P. Kilroy

March 1, 1932.  P. E. REIMULLER ET AL  1,847,850
INTERNAL COMBUSTION MOTOR
Filed April 23, 1928   6 Sheets-Sheet 6

Patented Mar. 1, 1932								1,847,850

UNITED STATES PATENT OFFICE

PAUL E. REIMULLER, CARYL REIMULLER, OSCAR C. REIMULLER, AND DAGMAR H. REIMULLER, OF WILMETTE, ILLINOIS

INTERNAL COMBUSTION MOTOR

Application filed April 23, 1928. Serial No. 272,042.

This invention relates to internal combustion motors.

An object of this invention is to provide a motor, particularly adapted for use in connection with aeroplanes and wherein means are utilized for developing great power in comparison with the size and weight of the motor and further, to provide a motor of the radial type in which timing apparatus, valves, cam shafts and the like are entirely eliminated.

Another object of the invention is to provide a radial motor of the type indicated, in which high compression of the gases may be effected, through the provision of separate chambers arranged so that an adequate charge may be drawn from the carburetor, the charge separately compressed, then fired, and the exhaust gases completely expelled, the cycles of operation being repeated in such manner that during a single revolution of the shaft 18 power impulses are communicated thereto, resulting in an evenly distributed and powerful transmission of power to the drive shaft.

A further object of the invention is to provide, in a motor of this type, an annular stationary casing including a plurality of chambers formed around the circumferential periphery thereof, and so disposed with reference to each other that the combustion and intake chambers are isolated from each other, thereby permitting complete exhaust of the spent gases and the independent intake of a liberal charge of a fresh fuel, and wherein a separate compression chamber independent of the combustion and intake chambers is utilized, whereby high compression of the gases is permitted, assuring power impulses of maximum strength.

A still further object of the invention is to provide in a motor of this character, a casing having circumferentially disposed chambers, in conjunction with a rotor provided with a plurality of movable vanes, the latter being so arranged and spaced with reference to each other and with respect to the circumferential chambers as to provide for eighteen power impulses for each complete revolution of the drive shaft, and further, said vanes are so arranged with reference to the chambers as to prevent any possibility of backfiring of the motor and at the same time permitting a series of power impulses to be delivered, each of which is effective for the full length of the combustion chamber.

Still another object of the invention is to provide a motor wherein both the casing and rotor are of built-up construction, permitting the same to be readily assembled and disassembled when desired.

It is also an object of the invention to provide a motor wherein the vanes carried by the rotor are movably mounted therein and are provided with anti-friction means adapted to co-operate with continuous cams provided in the walls of the motor casing, whereby the vanes are projected and withdrawn with reference to the walls of the chambers of the casing in predetermined order to effect a uniform and unvarying sequence of operations.

Also, the vanes so referred to are of a multiple type, whereby the contours of the motor chambers may be more accurately accommodated, the cam guides operating to move the multiple parts of each vane relatively to each other to accomplish this purpose; further the vanes, so arranged, are providing with sealing devices which are resiliently pressed into contact with the walls of the chambers of the motor casing.

Further, the motor provided by our invention includes an arrangement whereby continuously firing spark plugs may be utilized, which are connected to magnetos driven directly from the shaft carrying the rotor, and permitting the use of magnetos and spark plugs in duplicate or triplicate for the sake of dependable operation.

Other and further objects of the invention will more clearly appear from the description and claims hereinafter following.

In the drawings forming a part of this specification.

As shown in the drawings, the outside casing of the motor includes a central section 15, one side 16 of which is provided with a radially disposed peripheral flange 17 rabbeted at its outer edge as indicated at 18. The inner edge of the flange merges into a conical section 19 having a thickened portion 20 provided with a race 21 adapted to accommodate a plurality of balls 22 which bear upon a race 23 carried by the main shaft 24 of the motor. The opposite side 17 of the casing is in two parts, indicated by the reference characters 25 and 26. The part 25 is provided with a rounded conical portion 260 having bearings 27 and 28, each of which has mounted thereon a race 29 co-operating with a series of balls 30 which in turn bear upon races 31 which support the main shaft 24. The section 25 is provided with an annular radially extending flange 32 having a groove 33 adapted for the reception of a rib 34 formed upon the section 26, the section 26 corresponding in form to the flange 17 of the side 16, having its peripheral edge rabbeted as indicated at 35 for co-operation with a peripheral section 36.

The peripheral section 36 is provided with side walls 37 and 38, the inner peripheral edges of which fit over the rabbeted portions of the sides 16 and 26, being secured in position by suitable bolts. The side walls 37 and 38 are connected by a cross wall 39 which is irregular in contour so as to form combustion chambers as hereinafter described. The walls 37, 38 and 39 are reinforced by transversely extending ribs 40, which also provide extended air cooling surfaces of great efficiency, eliminating the necessity for use of water jackets or other cooling means.

Figure 1:
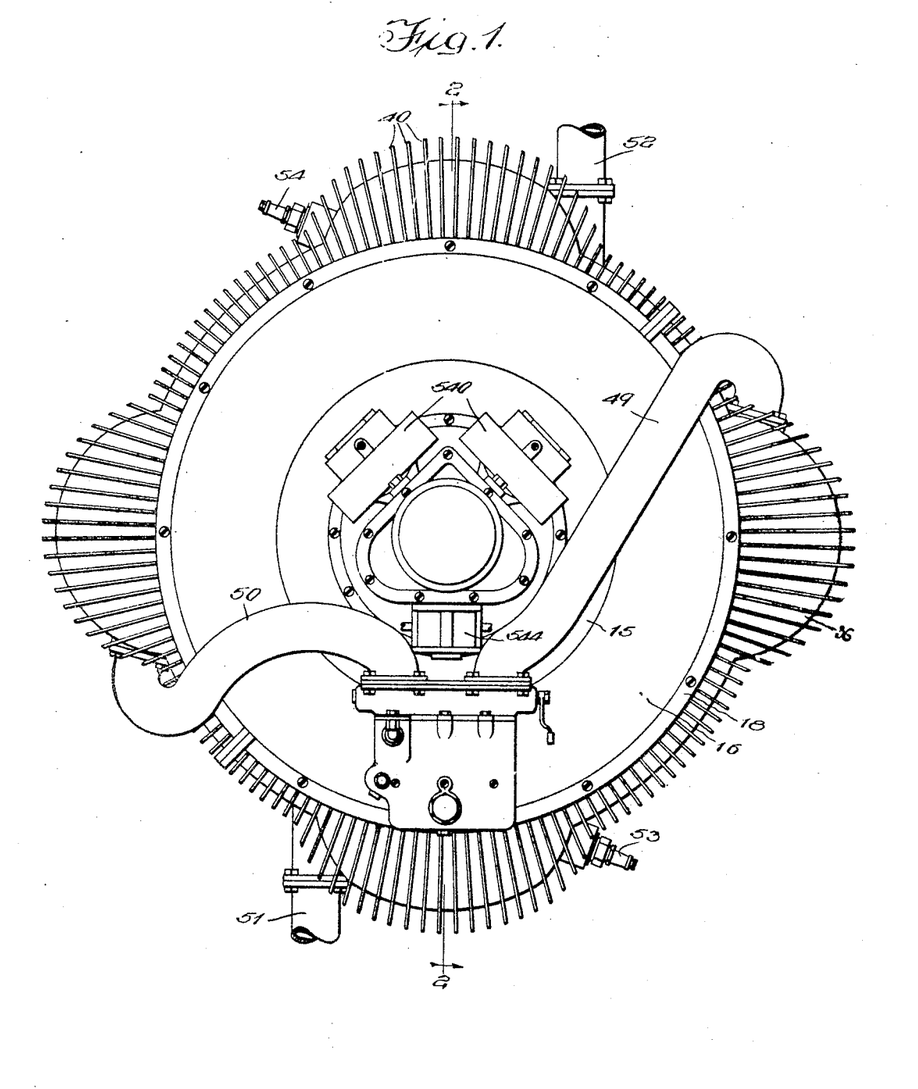
Figure 1 is a rear elevational view of the motor embodying the invention.
Figure 2:
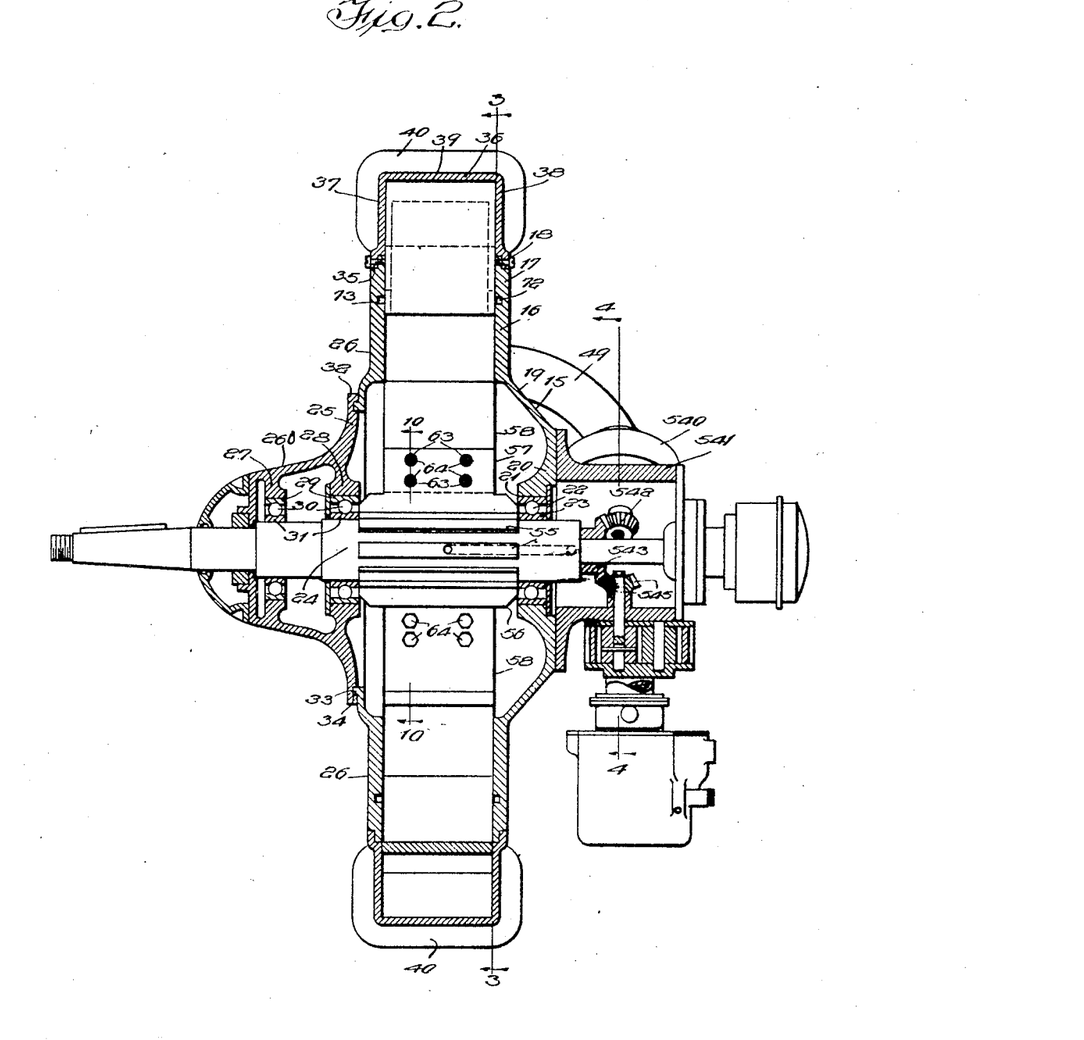
Figure 2 is a vertical sectional view of the invention corresponding substantially to the line 2—2 of Figure 1.
Figure 3:
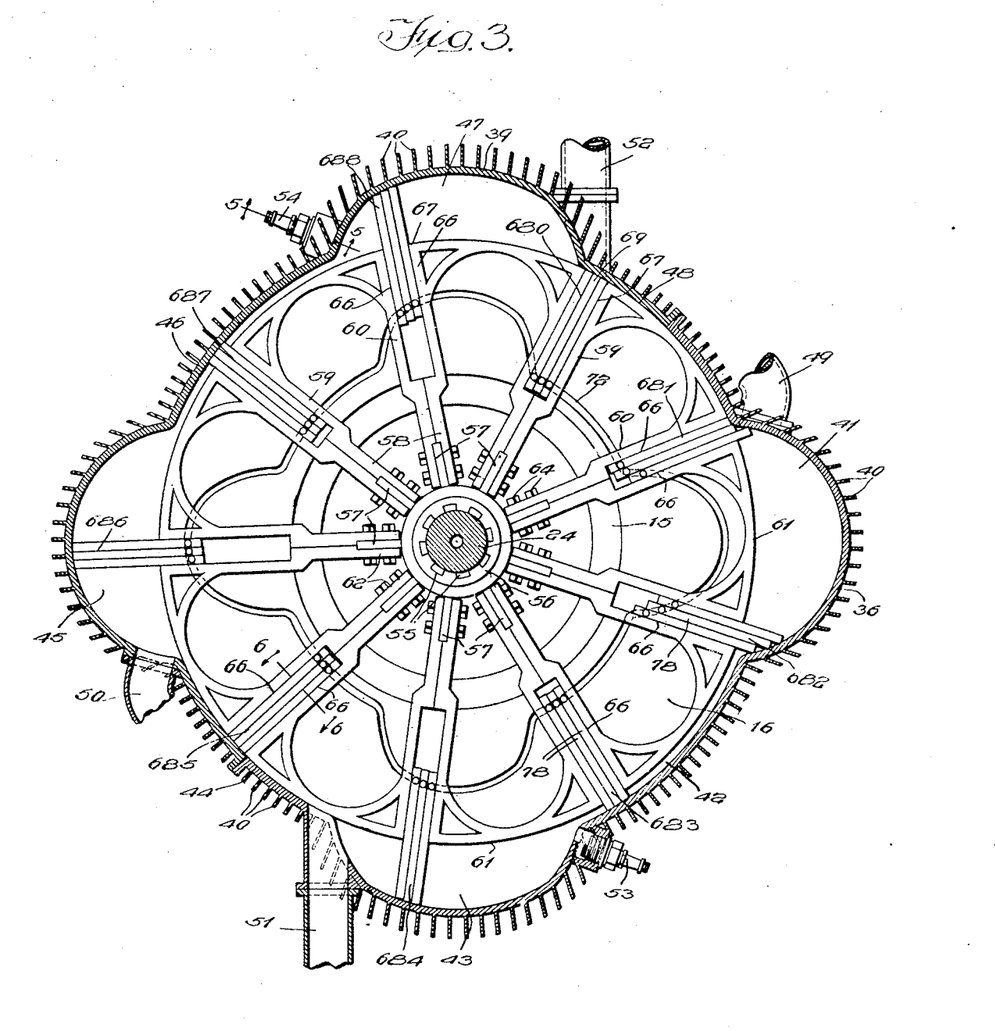
Figure 3 is a vertical sectional view of the invention corresponding substantially to the line 3—3 of Figure 2.
Figure 4:
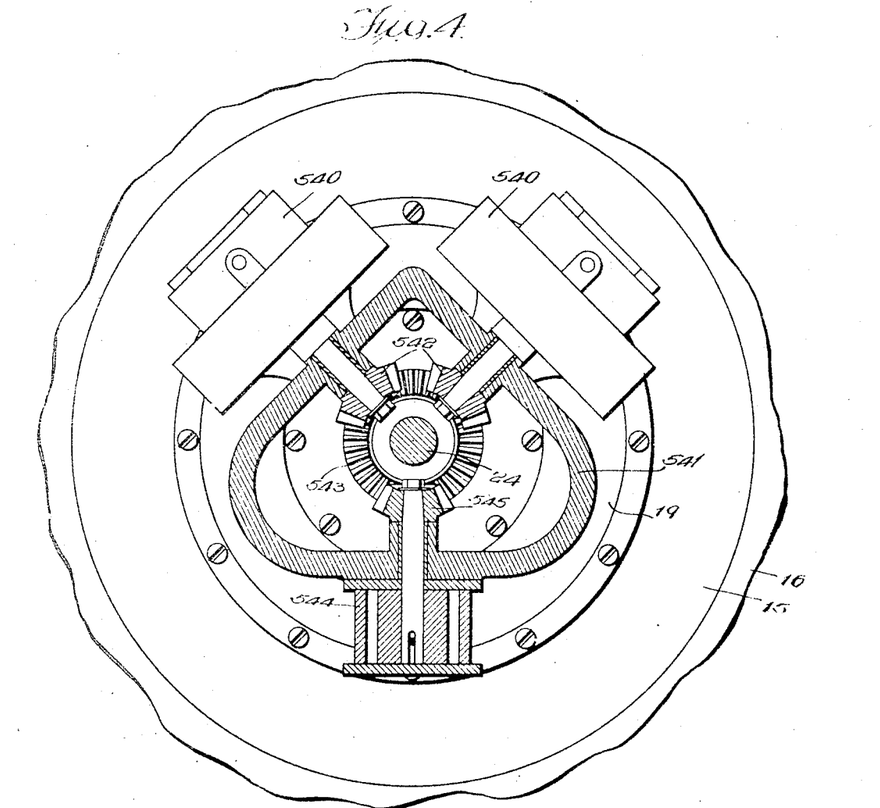
Figure 4 is an enlarged, vertical, sectional view corresponding substantially to the line 4—4 of Figure 2.
Figure 5:
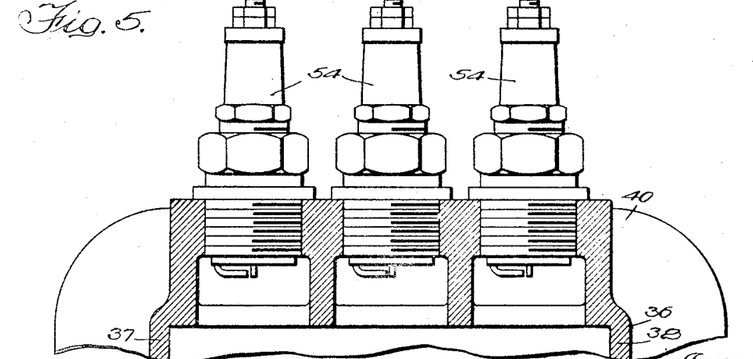
Figure 5 is an enlarged, vertical, sectional view of the invention corresponding substantially to the line 5—5 of Figure 3.

The chambers formed by the uneven contour of the top wall 39 comprise, beginning at the right as shown in Figure 3, an intake chamber 41, a compression chamber 42, a combined explosion and exhaust chamber 43, a separating portion 44, an intake chamber 45, compression chamber 46, combined explosion and exhaust chamber 47, and separating portion 48. The chambers 41 and 45 each have an intake pipe leading to the carburetor, said pipes being indicated by the reference characters 49 and 50. The chambers 43 and 47 each have an exhaust pipe leading away from the motor, said pipes being indicated by the reference characters 51 and 52. Each of the chambers 43 and 47 is provided with a plurality of spark plugs, indicated at 53 and 54, said spark plugs preferably being arranged in series, so that each of the chambers 43 and 47 is provided with three spark plugs all communicating with the related chamber and all adapted to fire continuously. Said spark plugs are connected to an arrangement of magnetos indicated at 540. Said magnetos are carried by a housing 541 and are driven by means of bevel gears 542, which directly engage with a bevel gear 543 carried by the main shaft 24. An oil pump 544 is also driven by the main shaft 24 through the use of a bevel gear 545. It is particularly pointed out that no timing means are utilized, the magnetos being designed to deliver a continuously vibrating spark to the spark plugs.

Referring to Figure 3, it will be noted that the intake chambers 41 and 45 are of relatively large size, and similar in all respects, being diametrically disposed with reference to each other. Likewise, the combustion chambers 43 and 47 are diametrically disposed and similar in capacity and outline. The compression chambers 42 and 46 are of restricted extent as compared with the intake and combustion chambers. These chambers also are diametrically disposed and similarly arranged. The separating portions 44 and 48 are similarly arranged and lie between the combustion and intake chambers. All of the chambers bear a definite arrangement to the rotor which now will be described.

Figure 11:
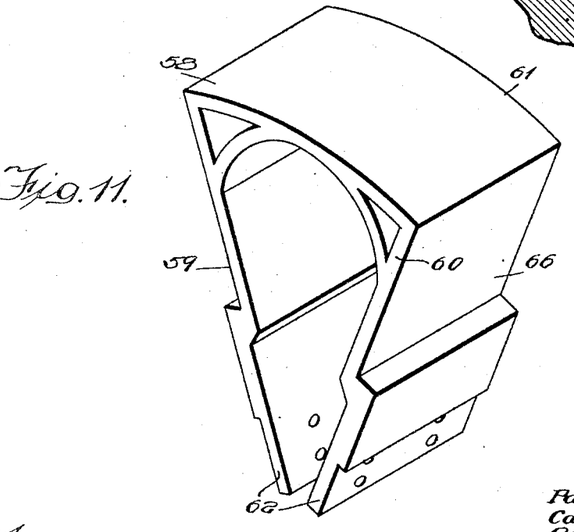
Figure 11 is an enlarged detail, perspective view of one of the segmental portions forming part of the rotor.

The main shaft 24 is provided with a plurality of keys or ribs 55 adapted to engage grooves in a hub 56 which rotates with the shaft. The hub 56 is provided with a plurality of radially extending spokes 57, each of which is flat and rectangular in shape, there being nine of such spokes formed upon the hub 56. Mounted upon each of the spokes 57 are the opposite side portions of a pair of segmental members 58, each of which is of the form best shown in detail in Figure 11.

Each segmental member 58 comprises side wall portions 59 and 60 and an arcuate peripheral portion 61, the side wall portions converging from the arcuate portion 61 toward their inner ends, the latter being somewhat spaced apart in order that the same may be properly secured to the spokes 57. Each segmental member 58 is hollow in construction to reduce the weight thereof.

Figure 10:
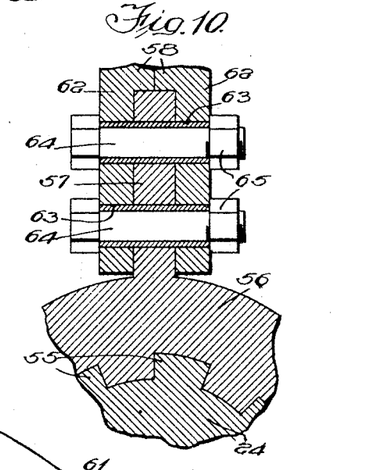
Figure 10 is a fragmentary, vertical, sectional view taken through the rotor, and corresponding to the line 10—10 of Figure 2, this view showing the means by which portions of the rotor are secured to the main shaft.

Each of the walls 59 and 60 of the segmental member is provided with an abutting portion 62 adapted to bear against one side of each spoke 57, while the adjacent segmental member is likewise provided with a portion 62 adapted to abut against the opposite side of the spoke 57, as best shown in Figure 10. Each of the portions 62 is provided with apertures to permit the passage of bushings indicated at 63, which have extended therethrough bolts 64, secured in position by nuts 65. Each of the walls 59 and 60 of each segmental member is provided with an offset or rabbet 66. Nine segmental members 58 are provided and the same are adapted to be arranged to form a complete annular rotor, the walls of adjacent segmental members being connected to the spokes 57. The rabbeted portions 66, when the segmental members are in position, provide guides 67 for the reception of multiple vane structures 680, 681, 682, 683, 684, 685, 686, 687 and 688, there being nine of said structures, and by reason of the disposition of the segmental members 58 and of the guides 67, the multiple vanes are spaced apart a distance bearing a predetermined relation to the peripheral diameter of the casing as hereinafter referred to.

Figure 6:
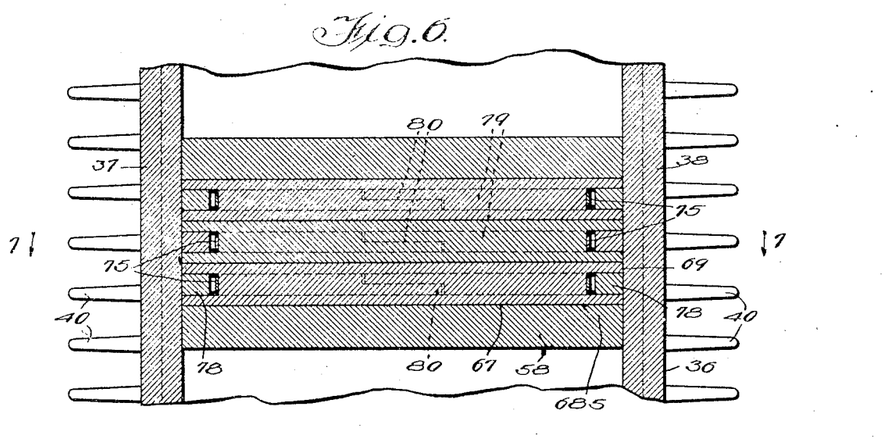
Figure 6 is a horizontal, sectional view taken through one of the vanes and corresponding to the line 6—6 of Figure 3.
Figure 7:
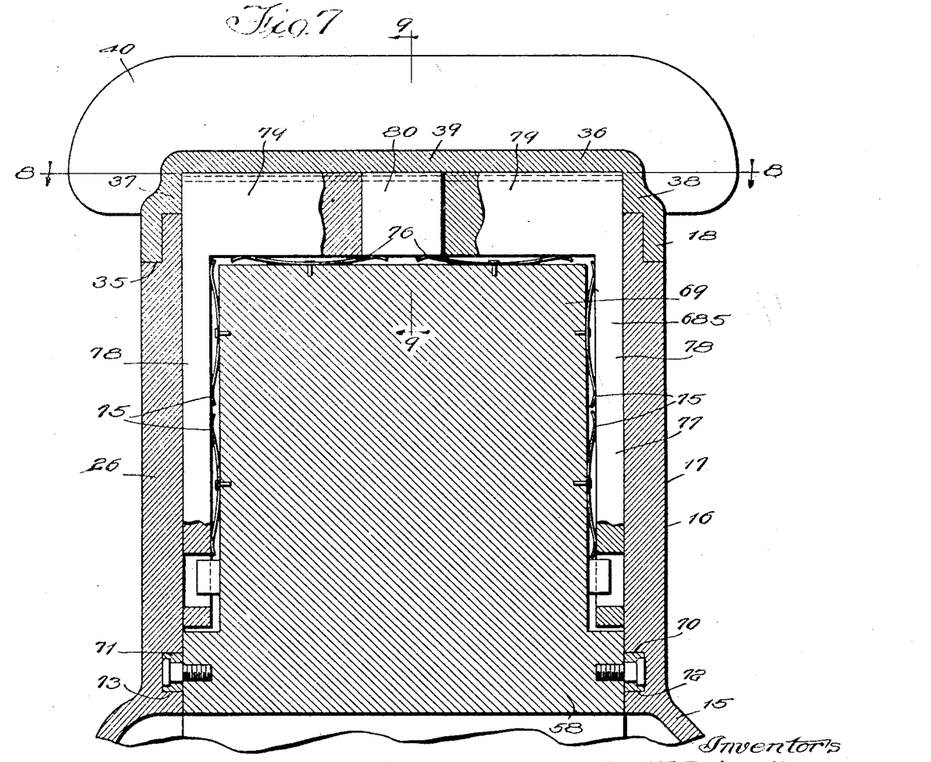
Figure 7 is a vertical, sectional view of the vane structure corresponding substantially to the line 7—7 of Figure 6.
Figure 8:
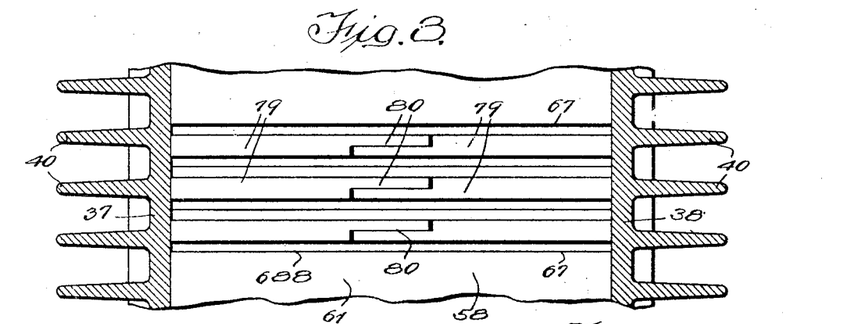
Figure 8 is a horizontal, sectional view similar to Figure 6, and corresponding to the line 8—8 of Figure 7, this view showing the outer ends of the sealing members in plan.
Figure 9:
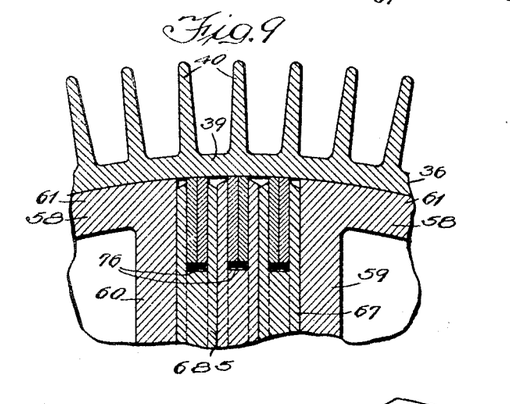
Figure 9 is a transverse, vertical, sectional view through the vane structure and corresponding to the line 9—9 of Figure 7.

Each of the multiple vane structures includes a plurality of independently movable slides 69, each of said slides being provided adjacent its bottom, with oppositely disposed anti-friction rollers 70 and 71, the rollers 70 being disposed in a continuous cam slot 72 formed in the side wall 16 of the casing while the rollers 71 are disposed in the cam slot 73 formed in the side wall 26 of the casing. Each of the cam slots 72 and 73 correspond in contour on a smaller scale to the outline of the top wall 39 of the casing, whereby, upon rotation of the rotor, each of the multiple vane structures will follow the contour of the wall 39. As best shown in Figures 6, 7 and 8, each of the slides 69 has its opposite side edges provided with grooves in which are secured leaf springs 75, while the top or outer edge is also provided with a groove in which are mounted leaf springs 76. Cooperating with the slide and mounted in the grooves thereof are sealing members 77, each including side sections 78—78 and outer sections 79—79, the sealing members 77 being disposed in opposite directions so that the portions 79 overlap at the center as indicated at 80, being cut out for this purpose, whereby the sections of the sealing members 77 are urged against the side walls 16 and 26 and against the wall 39, in this way maintaining efficient compression.

In operation, considering first the intake chamber 41, and assuming movement of the rotor in a clockwise direction, the vane 681 will traverse the chamber 41, due to the provision of the cam means 72, and the vacuum thus created will draw in the mixture. As soon as the vane 681 arrives at the end of the intake chamber 41, the mixture will be compressed between the vanes 681, 682 and the wall of the compression chamber 42, so called high compression being effected by reason of the comparative sizes of the intake chamber and compression chamber.

During this action, it will be appreciated that no exhaust gases can enter the intake chamber because of the small clearance afforded by the separating portion 48, the inner wall of which has a very minute clearance with respect to the periphery of the adjacent segmental section. Assuming still further rotation of the vane 681 to a position similar to that occupied by the vane 688, with the continuously firing spark plug 53, the explosion will take place, driving the vane 681 during the expansion of the gas throughout the entire length of the combustion chamber 43. When the vane 681 reaches the position occupied by the vane 684 in Figure 3, the exhausted gases will be expelled through the exhaust pipe 51 and none of the same can pass the separation portion 44 as will be appreciated. Of course, during this cycle, and when the vane 680 has reached the position occupied by the vane 681, upon further rotation of the rotor a new charge will be drawn into the chamber 41 and the cycle repeated so that by the time nine segments have passed the explosion chamber 43, nine explosions will have taken place imparting nine power impulses to the rotor. Starting with the intake chamber 45, and assuming rotation of the rotor to the combustion chamber 47, it will be seen that the same cycle is repeated, but this cycle of operations occurs out of unison with the first cycle and consequently during one revolution of the rotor nine explosions will occur in the combustion chamber 47, making a total of eighteen explosions to each revolution of the rotor.

Particular attention is called to the fact that complete exhaust of the gases is obtained, due to the separation portions 44 and 48 which also prevent any exhaust of the gases being carried over into the intake chambers 41 and 45. Further, by reason of the fact that in the combustion chamber the vanes confining the compressed gas must pass the spark plug before the explosion can take place and by reason of the enlarging character of the combustion chamber with reference to the spark plug, no back-firing can take place.

The cam means employed for operating the vanes positively actuate the same in both directions, and the compression rings or sealing members operate to maintain tight compression at all times. The segmental formation of the rotor, and the hollow construction of the segments provide a skeleton of relatively light weight which supports the vanes in position for the most advantageous operation. Further, the rotor as well as the casing may be assembled and disassembled with great convenience. The motor thus provided is extremely light in weight, and due to the large charges of fuel utilized and the great degree to which the same are compressed, in conjunction with the full power stroke throughout the combustion chamber, permitting complete explosion of the gases, great power is afforded, exceeding to a large extent any of the types of motors now used for driving aeroplanes. The spark plugs are continuously fired from a plurality of magnetos which insures dependable operation. Timing devices, valves, cam shafts and other numerous parts of ordinary motors, likely to cause trouble, are entirely eliminated.

While we have herein shown and described what we now consider the preferred manner of carrying out our invention, the same is merely illustrative and we contemplate all changes and modifications that come within the scope of the claims appended hereto.

We claim:—

1. In a motor of the character described, the combination with an annular rotor; of a casing having a plurality of series of means forming intake, compression, expansion and exhaust provisions, the series being arranged circumferentially about the periphery of said rotor, to provide for successive cycles of operation, said compression provision of each series co-operating with said rotor to define a chamber having uniform displacement throughout its extent; and a plurality of radially extending vanes spaced to co-operate in pairs with each provision of said series, said provisions and vanes being spaced and proportioned with respect to each other to present the vanes to ignition position in the expansion chambers in one series before the corresponding vanes reach ignition position in the expansion chamber of another series for imparting cumulative impulses to the vanes in all of the series before the expansion chamber in any one series is exhausted, and means in the ignition position in each expansion chamber for firing the charge therein when a vane reaches said ignition position.

2. In a motor of the character described, the combination with an annular rotor; of a casing having a plurality of series of means forming intake, compression, expansion and exhaust provisions, the series being arranged circumferentially about the periphery of said rotor, the provisions of each series being disposed in the order mentioned; said compression provision in conjunction with said rotor defining a chamber uniform in size circumferentially of said rotor and connecting at opposite ends with chambers formed by the expansion and intake provisions; a plurality of radially extending vanes spaced to cooperate in pairs with each provision of said series, said provisions and vanes being spaced and proportioned circumferentially with respect to each other to present certain of the vanes to ignition position in the expansion chambers at different times to enable an expansion stroke in one expansion chamber to be imparted to said rotor before the expansion stroke in another chamber is expended; and igniting means for each series of means, each igniting means being situated adjacent to the end of the compression chamber and at the beginning of and expansion chamber and constituting the ignition position.

3. In a motor of the character described, the combination with an annular rotor; of a casing having stationary side walls and a circumferentially extending wall providing a plurality of series of means in the form of intake ports, compression, and expansion chambers and exhaust ports, the several series being arranged circumferentially about the periphery of said rotor, and the ports and chambers of each series being disposed in the order mentioned; a shaft for said rotor carried by said side walls; a plurality of radially extending vanes spaced to co-operate in pairs with each provision of said series, said vanes being spaced and proportioned with respect to each other to present the vanes to ignition position in the expansion chamber of one series before the corresponding vane in another series reaches its exhaust position to impart a plurality of impulses to the rotor from the vanes in all the series before the expansion chamber in any one series is exhausted, and cam means for reciprocating said vanes during rotation of said rotor, and said means including guides in stationary side walls and co-operating means upon each vane.

4. In a motor of the character described, the combination with an annular rotor having a shaft and a plurality of segments keyed to said shaft, said segments having registering cut out portions providing radially extending guides; of a casing having stationary side walls for supporting said shaft for rotation, and provided with means forming an intake chamber, a compression chamber, an explosion chamber and an exhaust provision, said means extending in order circumferentially about the periphery of said rotor, said intake and explosion chambers being radially of relatively large capacity and separated by the compression chamber which is radially of relatively small capacity, the latter chamber being defined by means conforming to the curvature of said annular rotor and uniformly spaced therefrom circumferentially for an appreciable extent; and vanes slidably mounted in said radially extending guides, each of said vanes comprising a plurality of relatively movable sections; cam groove extending along the side walls of said casing, each section of each vane being provided with means engaging said cam groove, whereby radial movement of said sections inwardly and outwardly is effected by the contour of said cam means.

5. In a motor, the combination with an annular rotor; of a casing surrounding said rotor and having elements arranged substantially in octagonal form, each octagonally disposed portion defining in succession series of cycles including intake, compression, expansion and exhaust, similar portions being diametrically disposed; and a plurality of vanes for said rotor, each of said vanes being disposed diametrically out of line with the opposed vane to a degree whereby one vane reaches ignition position before the opposed vane reaches exhaust position in their respective expansive chambers to impart two power impulses to said rotor before any of the expansion chambers are exhausted.

In witness that we claim the foregoing, we have hereunto subscribed our names this 11th day of April, 1928.

PAUL E. REIMULLER.
CARYL REIMULLER.
OSCAR C. REIMULLER.
DAGMAR H. REIMULLER.